US012529232B2

(12) United States Patent
Sarrablo Moreno et al.

(10) Patent No.: US 12,529,232 B2
(45) Date of Patent: Jan. 20, 2026

(54) CLADDING PANEL THAT COLLECTS AND/OR EMITS THERMAL ENERGY

(71) Applicants: UNIVERSITAT INTERNACIONAL DE CATALUNYA, FUNDACIÓ PRIVADA, Barcelona (ES); NEOLITH DISTRIBUTION, SL, Madrid (ES)

(72) Inventors: Vicente Sarrablo Moreno, Castelldefels (ES); Jordi Roviras Miñana, Barcelona (ES)

(73) Assignees: UNIVERSITAT INTERNACIONAL DE CATALUNYA, FUNDACIÓ PRIVADA, Barcelona (ES); NEOLITH DISTRIBUTION, SL, Madrid (ES)

( * ) Notice: Subject to any disclaimer, the term of this patent is extended or adjusted under 35 U.S.C. 154(b) by 363 days.

(21) Appl. No.: 18/251,669

(22) PCT Filed: Sep. 28, 2021

(86) PCT No.: PCT/ES2021/070701
§ 371 (c)(1),
(2) Date: May 3, 2023

(87) PCT Pub. No.: WO2022/096761
PCT Pub. Date: May 12, 2022

(65) Prior Publication Data
US 2023/0407643 A1 Dec. 21, 2023

(30) Foreign Application Priority Data
Nov. 5, 2020 (ES) ................ ES202031114

(51) Int. Cl.
*E04F 13/08* (2006.01)
*F24S 10/70* (2018.01)
(Continued)

(52) U.S. Cl.
CPC ...... *E04F 13/0869* (2013.01); *E04F 13/0876* (2013.01); *E04F 13/0894* (2013.01);
(Continued)

(58) Field of Classification Search
CPC ............ E04F 13/0869; E04F 13/0876; E04F 13/0894; F24S 10/70; F24S 70/25;
(Continued)

(56) References Cited

U.S. PATENT DOCUMENTS 4,212,348 A * 7/1980 Kobayashi ............... F24D 3/14
165/49
4,257,481 A * 3/1981 Dobson ................ F24S 20/66
165/905

(Continued)

FOREIGN PATENT DOCUMENTS

CN 101799216 A 8/2010
DE 4240252 A1 8/1993
(Continued)

OTHER PUBLICATIONS

International Search Report for PCT/ES2021/070701, Prepared by the Spanish Patent Office, mailing date Nov. 5, 2021, 7 pages including English Translation.

*Primary Examiner* — Brian E Glessner
*Assistant Examiner* — Adam G Barlow
(74) *Attorney, Agent, or Firm* — Brooks Kushman P.C.

(57) ABSTRACT

A cladding panel that collects and/or emits thermal energy, which includes: a first panel; a second panel with an extrados adhered to an intrados of the first panel, forming a leaktight seal, with a low-relief channel, the channel being attached to the intrados of the first panel to form a conduit; an inlet connector for heat-conducting fluid, connected to a first end of the channel; and an outlet connector for heat-conducting fluid, connected to a second end of the channel, wherein the
(Continued)

first panel is made of calibrated laminated ceramic with a flat, smooth intrados and a flat, smooth extrados and has a uniform thickness of 3-6 mm, and the second panel is made of waterproof heat-insulating plastic that is stable up to 120° C.

25 Claims, 5 Drawing Sheets

(51) Int. Cl.
  *F24S 70/25* (2018.01)
  *F24S 70/65* (2018.01)
  *F24S 80/30* (2018.01)
(52) U.S. Cl.
  CPC ............... *F24S 10/70* (2018.05); *F24S 70/25* (2018.05); *F24S 70/65* (2018.05); *F24S 80/30* (2018.05); *E04F 2290/023* (2013.01)
(58) Field of Classification Search
  CPC .......... F24S 70/65; F24S 80/30; F24S 10/503; F24D 3/125; F24D 3/14; F24D 3/147
  USPC ..... 52/220.1–220.4; 126/271, 436, 448, 450, 126/569, 617, 621, 628, 633, 651, 704, 126/705, 709, 710, 745.07; 165/49
  See application file for complete search history.

(56) References Cited

U.S. PATENT DOCUMENTS

| | | | | |
|---|---|---|---|---|
| 4,515,151 | A * | 5/1985 | Slemmons | F24S 80/65 126/669 |
| 4,608,960 | A * | 9/1986 | Hering | B29D 99/001 428/188 |
| 4,779,673 | A * | 10/1988 | Chiles | F28F 21/062 165/905 |
| 4,911,353 | A * | 3/1990 | Deakin | F24S 10/75 228/183 |
| 6,196,216 | B1 * | 3/2001 | Kooij | B29C 66/73921 126/621 |
| 8,677,706 | B2 * | 3/2014 | Krecke | E04C 2/525 52/302.3 |
| 2009/0229598 | A1 | 9/2009 | Cao et al. | |
| 2015/0000888 | A1 * | 1/2015 | Langer | E05F 15/643 156/60 |
| 2015/0218813 | A1 * | 8/2015 | Koca | F24D 3/125 52/173.1 |
| 2022/0252278 | A1 * | 8/2022 | Neumann | F24D 3/165 |
| 2023/0151616 | A1 * | 5/2023 | Dicke | E04F 13/0866 52/173.1 |

FOREIGN PATENT DOCUMENTS

| | | |
|---|---|---|
| ES | 2334876 A1 | 12/2010 |
| GB | 2473447 A | 3/2011 |

* cited by examiner

Fig.6

CLADDING PANEL THAT COLLECTS AND/OR EMITS THERMAL ENERGY

CROSS-REFERENCE TO RELATED APPLICATION

This application is the U.S. national phase of PCT Application No. PCT/ES2021/070701 filed on Sep. 28, 2021, which claims priority to ES Patent Application No. P202031114 filed on Nov. 5, 2020, the disclosures of which are incorporated in their entirety by reference herein.

FIELD OF TECHNOLOGY

The present invention concerns a thermal energy collecting and/or emitter cladding panel, i.e. a panel intended for cladding other constructive elements, such as walls, floors, and roofs, which also enables incident thermal energy, e.g. solar energy, to be collected for storage and/or use, and/or which also enables the thermal energy supplied to said cladding panel to be emitted, e.g. for climate control in an enclosed space.

STATE OF THE ART

Thermal energy collector and/or emitter panels are well known. Typically, they include a first panel, usually of metal, with heat carrying fluid pipes attached to the back, and with glass acting as an infrared trap covering their front.

Typically, the piping used is of metal to improve thermal transmittance from the first panel to the piping, with a circular cross-section to facilitate bending in any direction to obtain a serpentine circuit. However, the use of metal pipes increases thermal losses, making it necessary to add thermal insulation to the back of the first panel, and the use of circular pipes reduces the contact surface between these pipes and the first panel, minimising thermal transfer between the two and making it necessary to add a filler element with good thermal conductivity between the pipe and the first panel to improve thermal transfer.

The resulting solution is therefore expensive and heavy, as its entire surface is covered with glass, making it difficult to integrate aesthetically into a building, due to the limitations imposed by the use of a glass finish. In addition, this solution is optimised for thermal energy collection only, but is not efficient as a thermal energy emitter, because the use of glass reduces heat emission in the form of infrared frequencies.

Other solutions similar to the above are also known, in which the use of glass is dispensed with, which increases energy losses in the form of infrared radiation on the front side of the first panel, which is detrimental to its performance when it acts as a collector.

When the panel is intended for use as a thermal energy collector, typically the first panel is a metal panel which, due to its high thermal conductivity, transfers heat efficiently to the heat transfer fluid. However, if a thin metal panel of the kind typically employed is used without the glass, it radiates heat very quickly to the front side and this can cause, for example during the passing of clouds, a lot of energy to be lost from the system, as well as significant fluctuations in the temperature of the heat transfer fluid.

These temperature fluctuations, even for a short time, require the use of auxiliary heating equipment that consumes energy, typically gas or electricity, to maintain the temperature of the heat transfer fluid, which in turn increases the cost and emissions of the collection system.

In addition, metallic materials have oxidation problems and usually high reflectivity, requiring them to be coated with protective paints or lacquers that increase their thermal energy uptake but reduce their thermal conductivity.

In addition, metallic materials cannot be easily and safely cut, as they produce sharp edges with no rust protection, which in turn makes them difficult to adapt architecturally in predefined spaces with cut trim panels lacking in collection capacity.

In terms of architectural integration, there are also known solutions such as the one without glass described above, which covers the first panel with a decorative coating behind which the rest of the collector panel and/or thermal energy emitter is hidden. However, this additional coating greatly reduces the efficiency of the system, as it is the decorative coating that, when functioning as a collector, receives the incident thermal energy and has to transmit this thermal energy to the first panel, which reduces the efficiency of the system, or that, when functioning as an emitter, presents the same problem, but with the energy moving from the first panel to the decorative coating. An example of such a system is described in ES2334876A1, where the decorative coating is a slate tile roof.

When the panel is intended for use as a thermal energy emitter, the first panel is known to be a plasterboard panel, allowing it to be integrated as an interior wall of an enclosed interior space. However, the plasterboard panel transmits heat inefficiently. In addition, this solution cannot be used on floors or outdoors, and can only be used as a heat emitter but not as a collector, which means that its production volumes will be small and its price correspondingly high.

There are also known collector panels and/or thermal energy emitters which use a panel with embedded pipes inside it for channelling the heat transfer fluid, so that one side of the panel, exposed to solar radiation, heats the heat transfer fluid circulating inside it. This solution also allows thermal energy to be emitted through the panel, as it is not coated with glass and can emit heat in the form of infrared radiation. However, in this type of solution, all the material that makes up the first panel, located on the reverse side, produces thermal losses, as it has the same thermal conductivity as the front side.

For example, DE4240252A1 describes a panel formed from a first and a second symmetrical ceramic panel, each with channels in low relief on one side. The bonding of the two ceramic panels defines pipes inside the resulting panel. This solution requires relief-moulded ceramic panels, a manufacturing technique that limits the maximum panel size, making it more expensive to manufacture and requiring minimum material thicknesses, producing small and heavy panels. In addition, the resulting panel will have a high weight and thermal inertia and will either have thermal losses or require insulation on the reverse side.

Document US2009229598A1 also describes the use of ceramic panels, in this case extruded ceramic panels defining a plurality of parallel longitudinal channels inside them. This solution enables cheaper and lighter manufacture than the moulded solution mentioned above, but makes the connection of pipes more complicated, as a manifold is required at the ends of the ceramic panels to connect an input and an output pipe with all the parallel channels of the first panel, making installation more expensive and increasing the risk of leakage. This solution also does not solve the thermal losses on the reverse side of the first panel.

The present invention solves the above and other problems.

BRIEF DESCRIPTION OF THE INVENTION

The present invention concerns a thermal energy collecting and/or emitter cladding panel comprising, in a manner known per se:

a first panel with an upper surface intended to be exposed, and with a lower surface;

a second panel with an upper surface attached to the lower surface of the first panel, and with a low relief channel defined in the upper surface of the second panel, with the channel attached to the lower surface of the first panel forming a duct for the channelling of a heat transfer fluid, the adhesion between the first panel and the second panel forming a tight seal with the transfer fluid at least in a perimeter area of the second panel;

a heat transfer fluid inlet port connected to one end of the low relief channel, and a heat transfer fluid outlet port connected to the other end of the low relief channel, the inlet port and the outlet port being connected to a heat transfer fluid circuit.

Thus, in the proposed solution, the second panel is engraved with a channel on the front. Typically it will be a serpentine channel, although branching of the channel into multiple branches and subsequent reunification, within the second panel, between a first end and a second end of the channel in low relief is not ruled out either.

Such a low relief channel will therefore be open and accessible through the front of the second panel and may therefore be machined or preferably moulded into the material, constituting the second panel through this front side.

The front of the second panel is adhered to the back of the first panel, so that the back of the first panel seals the low relief channel, making it a closed duct so that the heat transfer fluid circulating inside it is in direct contact with the back of the first panel, maximising the heat transfer between the two.

The adhesion between the first panel and the second panel shall produce a hermetic seal of the duct defined by the low relief channel and the back of the first panel, the duct being accessible only through an inlet pipe and an outlet pipe connected respectively to the first and second opposite ends of the low relief channel.

These inlet and outlet ducts shall also be connected to a heat transfer fluid circuit, allowing the heat transfer fluid to be introduced into the low relief channel through the first end and extracted through the second end.

Such a heat transfer fluid circuit will typically include multiple collector and/or heat-emitting cladding panels such as the one proposed, connected in series, in parallel or in a combination of series and parallel panels, and may also include other elements typical of these circuits, such as an insulated storage tank, an expansion vessel and regulating valves.

The present invention further proposes, in a manner not yet known, that the first panel is of laminated and calibrated ceramic material with flat and smooth upper and lower surfaces, with a uniform thickness of between 3 mm and 6 mm, and that the second panel is made of insulating plastic, waterproof and stable at temperatures up to a minimum of 120° C.

Laminated and calibrated ceramic is a porcelain ceramic obtained via a manufacturing process that enables the production of large 3 m-long panels with a width of more than 1 m, perfectly flat and with very reduced thicknesses, even as thin as 3 mm, 4 mm, 5 mm, or 6 mm. This type of porcelain ceramic panel is sufficiently resistant to impact and bending, even with such reduced thicknesses, enabling the manufacture of very large, lightweight panels that can be handled without breaking.

In addition, it is a weather-resistant, waterproof material that does not deteriorate in contact with the elements and can be walked on without breaking, meaning that it can be installed in indoor or outdoor floors, indoor or outdoor walls or roofs, and can act as a collector or emitter interchangeably. This allows for increased production volumes and therefore lower prices.

In addition, ceramic is a material frequently used in both exterior and interior finishes, as it has a very wide range of colours and textures, so the use of this material in the panel finish facilitates its architectural integration. Ceramic material can also be cut to the desired size, for example, to cut ceramic panels that do not have the capacity to emit and/or collect thermal energy in order to finish off peripheral areas of a surface covered with such cladding panels, allowing complete architectural integration in any space. This feature makes it possible to completely cover a surface with ceramic panels of identical appearance, combining collector panels and/or thermal energy emitters together with other panels that do not have this capability. The low cost of the proposed cladding panels means that some of them can be cut to adapt to the peripheral areas without sacrificing their functionality as a collector and/or emitter panel, and without incurring additional costs. This simplifies the logistics, as there is no need to calculate and send two types of panels to the site, again reducing the overall cost.

As this material is able to completely cover a surface of any size and shape, it can make up the single enclosure and/or surface finish for that particular surface, also performing the functions of waterproofing and/or enclosure. This means that the proposed cladding panels can replace other building components, making the resulting assembly cheaper.

The second panel is made of a plastic material that may be much lighter than the first panel of ceramic material, and which provides some thermal insulation on the reverse side of the first panel. This second panel includes the low relief channels in its thickness, while leaving the heat transfer fluid in direct contact with the back of the first panel. Therefore, the second panel provides thermal insulation to the heat transfer fluid circulating inside it, which reduces thermal losses without impeding the thermal transmittance from the first panel to the heat transfer fluid, thanks to the direct contact between the two through the back of the first panel covering the low relief channels.

The plastic material constituting the second panel shall be selected to withstand temperatures up to 120° C. without deterioration, as it will be in direct contact with the heat transfer fluid and the first panel, which can reach high temperatures if exposed to the sun.

The resulting cladding panel is a panel that can be manufactured in a very simple and therefore very economical way, allowing the production of large panels which, thanks to their reduced weight due to their reduced thickness, can be easily handled by one or two operators. Large panels simplify and speed up the installation, minimising the number of connections and therefore also making the installation cheaper while reducing possible leakage points of the heat transfer fluid.

Furthermore, the final finish of the cladding panel is indistinguishable from a cladding panel without thermal energy collection and/or emission capabilities, facilitating its architectural integration next to panels without this capability, for example, in façade cladding or in radiant floors or walls. This makes it possible to adapt the thermal energy collection or emission surface to the thermal needs of the building, completing the rest of the surfaces that do not need these capacities, or that need to be cut, with other panels of an identical look, thus obtaining a uniform appearance.

This solution also allows any colour of ceramic panel to be used as the first panel, although dark colours are preferably recommended, e.g. colours with an albedo of 0.25 or less or which absorb at least 75% of the incident solar energy, and it also allows the use of ceramic panels that include a pattern, e.g. of stone veins, borders, or images.

According to another embodiment of the invention, the second panel may be made of a non-foamed plastic, i.e. a plastic with no air trapped inside.

Preferably such non-foamed plastic will have a density of between 60 kg/m$^3$ y 1200 kg/m$^3$, and/or a thermal conductivity of 0.25 W/m° K or less. Such plastics are very stable, rigid and resistant, and therefore also provide structural support to the whole cladding panel. The thermal conductivity of this type of material, which is much lower than the thermal conductivity of the first material, provides some insulation to the reverse side of the first material and to the heat transfer fluid.

Alternatively, it is envisaged that the second panel will be made of a foamed plastic, i.e. a plastic with air trapped inside. Preferably such foamed plastic will have a density of between 10 kg/m$^3$ y 200 kg/m$^3$ and/or a thermal conductivity of 0.12 W/m° K or less. Thus, the proposed foamed plastics are lighter and offer better thermal insulation than non-foamed plastics, however, they provide a much lower structural strength to the first panel than the non-foamed plastics mentioned above.

According to a preferred embodiment, the second panel shall have a thickness equal to or less than 20 mm, or preferably equal to or less than 14 mm. It is also proposed that, alternatively or in addition, the low relief channel should have a maximum depth of 15 mm or less, or preferably 10 mm or less. Thus, the thickness of the first and second panels as a whole shall be 26 mm or less, or even 20 mm or less.

With regard to the bonding of the first and second panels, it is proposed that the second panel may be bonded to the first panel by hot-melt, i.e. by partial melting, and subsequent solidification, of the front side of the second panel in contact with the back side of the first panel, causing their watertight bonding. This can be achieved by heating the first panel to a temperature above 120° C., overlaying the second panel, and then cooling it down.

Alternatively, the second panel may be bonded to the first panel by means of an adhesive that is stable at temperatures up to at least 120° C.

The second panel may also be bonded to the first panel by means of a bonding sheet, glued or hot-melt bonded to the first panel and the second panel, e.g. a foil defining a frame around the channel in low relief providing a perimeter seal. Such a sheet of interposing material may be attached to the first panel on one side and to the second panel on the opposite side, or it may be attached to both the first panel and to the second panel on laterally adjacent areas of the same face of the interlayer sheet.

According to one embodiment, such a bonding sheet may be made of a thermoplastic polymer, which may be bonded to the back of the first panel by hot-melt, and which may be bonded to the second panel by adhesives or also by hot-melt.

According to another embodiment of the invention, the low relief channel will be wider than the bottom.

It is also envisaged that the width of the low relief channel will be decreasing in depth and maximum on its surface in contact with the lower surface with the first panel. This maximises the heat transfer surface between the heat transfer fluid and the first panel, limiting the volume of heat transfer fluid. For example, it is envisaged that the channel can have a semi-circular cross-section, minimising the contact surface of the heat transfer fluid with the second panel and therefore minimising heat losses.

The present invention also considers the inclusion of a third panel, of thermal insulating material, attached or adhered to the lower surface of the second panel. This third panel, unlike the second panel, shall be optimised to maximise thermal insulation without other requirements related to the heat transfer fluid conduction.

The third panel will preferably have a greater thickness to that of the second panel and/or a lower density than the second panel and/or a lower thermal conductivity than the second panel. Preferably, the third panel will be thicker and better insulated than the second panel and will have a lower density.

The first panel should preferably have a density equal to or greater than 2200 kg/m$^3$ and/or a thermal conductivity equal to or greater than 0.8 W/m° K. The first panel may also include additives, e.g. metallic additives, to increase its thermal conductivity.

Preferably the cladding panel has a height of 2.2 m or more, and/or a surface area of 1.5 m$^2$ or more, allowing the full height between floors of a building to be covered with a single panel, maximising the speed of installation, and minimising the number of connections.

The cladding panel may weigh 25 kg/m$^2$ or less, or preferably 15 kg/m$^2$ or less, which facilitates the manual installation of panels with a surface area of more than 1.5 m$^2$ by two operators, without the need for lifting equipment.

According to another embodiment of the invention, the lower surface of the first panel has a conductive coating with a thermal conductivity higher than the thermal conductivity of the first panel. This conductive coating conducts heat away from the areas of the first panel which are not directly facing a low relief channel to the areas of the first panel in direct contact with the heat transfer fluid, accelerating their heat transfer to the heat transfer fluid and thus improving the efficiency of the assembly.

Such a conductive coating of the lower surface of the first panel may be, for example, a paint, a varnish, an enamel, or an enamel with metallic particles, or a metallic vapour deposition.

The first panel may also have, at least on its upper surface, a selective absorbing coating transparent to sunlight in the visible spectrum and with a low emissivity in the infrared and/or far infrared light spectrum. This selective absorber coating acts as an infrared trap, which maximises the collection of thermal energy from the incidence of sunlight but reduces radiation losses from the first panel through the front, increasing the efficiency of the assembly.

The selective absorbent coating can be, for example, a varnish or an enamel.

According to another accomplishment of the invention, the second panel is composed of one of the following materials: rubber, ethylene propylene diene rubber, acrylic, polyamide, polycarbonate, polyester, expanded polystyrene, extruded polystyrene, polyisocyanurate, polyetheretherketone, polytetrafluoroethylene.

It is further contemplated that the perimeter of the cladding panel will include, on opposite sides, complementary tongue-and-groove configurations configured for the attachment of a succession of identical cladding panels through these tongue-and-groove configurations. Such tongue-and-groove configurations may be formed by an offset between the first panel and the second panel, and/or by a tongue-and-groove configuration defined on the sides of the second panel.

It is also proposed that the inlet connector and the outlet connector each be a conduit that passes through the second panel and is bonded to the second panel around the perimeter of the aforementioned duct, providing a leak-tight seal for the heat transfer fluid. That is, the inlet connector will be a section of duct, preferably rigid, passing through the second panel into a first end of the low relief channel, with the duct completely surrounded by and attached to the first panel. The same applies to the outlet connector.

This construction allows the inlet connector to be bonded only to the second panel, providing a leak-tight seal around it, rather than between the first panel and the second panel, which would require the inlet connector to be bonded to both the first and second panels, making it difficult to ensure a leak-tight seal.

Alternatively, it is proposed that the inlet connector and the outlet connector are located between the first and second panels, are in contact with and bonded to both panels, providing a heat transfer fluid-tight seal, in order to minimise the thickness of the cladding panel, facilitating its use, e.g. as underfloor heating.

In a preferred embodiment of the invention, the cladding panel is anchored to a support by means of anchors, for example, a vertical or sloping support bracket. This solution allows dry mounting and installation on façades and roofs.

It is proposed that such anchorages may include the inlet connector and/or the outlet connector and/or a connecting pipe between the input and output conductors of adjacent cladding panels. That is to say that the cladding panel shall be attached to its support bracket using these input and/or output connectors that make up part of the anchorages, and/or through a connecting pipe enabling the connection of the input and output connectors of the adjacent cladding panels.

Alternatively, it is proposed that the cladding panel is bonded to a substrate, e.g. by adhesives or cement. This solution is suitable for passable floors, as it guarantees the correct transmission of compressive stresses, or also for vertical or inclined walls that may have to withstand impacts or significant point or concentrated forces.

It is also proposed that the inlet and outlet connector of the same panel be parallel to each other and located at opposite ends of the same side of the cladding panel, facilitating the serial connection of multiple cladding panels by means of a preferably rigid U-shaped conduit connector connecting the outlet connector of one panel to the input panel of an adjacent panel, which will be next to each other when adjacent cladding panels are positioned.

Preferably, these inlet and outlet connectors are parallel to the front side of the first panel, being contained in the edge of the cladding panel, meaning they can be installed with limited thickness, allowing the conduit connector to be flush with the thickness of the cladding panel. In this embodiment, the second panel will include a hollow space in its edge to accommodate the connecting conduit, with the cladding panels adjacent to each other.

In another embodiment, the inlet and outlet connectors of the same panel are parallel and coaxial and are arranged on opposite sides of the cladding panel, allowing an inlet connector of one panel to be aligned and coaxial with an outlet connector of an adjacent cladding panel, facilitating their connection directly or by means of an interposed straight connector conduit.

In another embodiment, the inlet connector and outlet connector are perpendicular to the front side of the first panel, and are accessible through the back of the second panel, allowing simple connection from behind the cladding panel.

Other inlet and outlet connector arrangements are also covered.

A system is also proposed whereby cladding panels are integrated in the same building on at least one exterior surface of the building exposed to direct sunlight for the collection of thermal energy and on at least one interior surface of an enclosed space of the building for the emission of thermal energy, the exterior and interior cladding panels being connected for the transmission of thermal energy from the outside to the inside of the building.

The heat transfer fluid is preferably water or water with an antifreeze such as glycol or a derivative thereof.

It will also be understood that any range of values offered may not be optimal in their extreme values and may require adaptations of the invention to make such extreme values applicable, such adaptations being within the skill and knowledge of a person skilled in the art.

Other features of the invention will appear in the following detailed description of an example embodiment.

BRIEF DESCRIPTION OF THE FIGURES

The foregoing and other advantages and features will be more fully understood from the following detailed description of an example embodiment with reference to the attached drawings, which are to be taken by way of illustration, but not limited, wherein.

DETAILED DESCRIPTION OF AN EXAMPLE OF AN IMPLEMENTATION

The attached figures show examples of non-limiting illustrative embodiments of the present invention.

Figure 6:
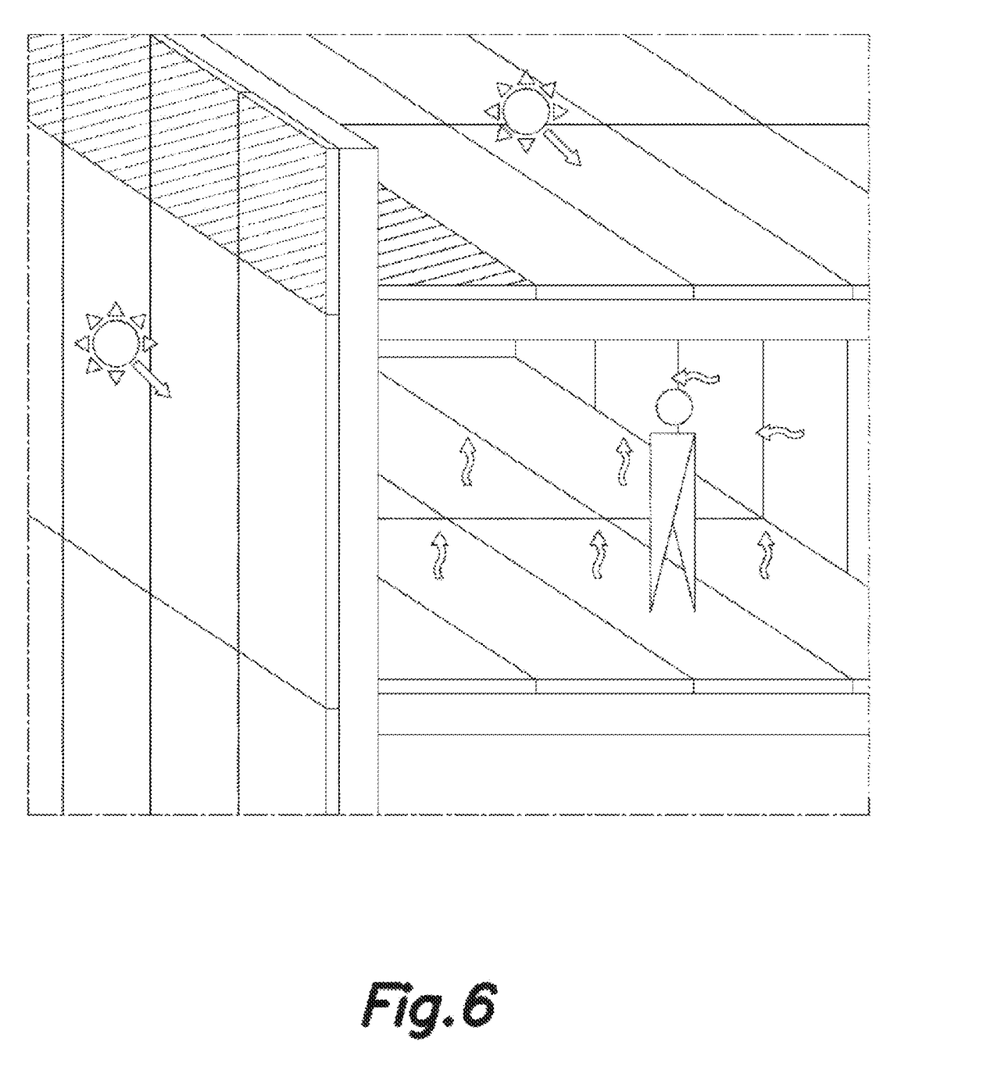
FIG. 6 shows a sectional perspective view of a building comprising cladding panels on an exterior façade and on a flat roof which may be passable, acting as thermal energy collectors of incident sunlight, represented here by a sun cone, and on an interior floor and an interior wall cladding acting as a thermal energy emitter, symbolised by a wavy arrow, where they are combined with some cladding panels with the same finished appearance but without collection and/or emission capacity which have been marked with a hatching.

FIG. 6 shows a building in which cladding panels such as those proposed have been integrated, both on exterior surfaces where sunlight strikes directly and where the cladding panels can act as solar thermal energy collectors, and on closed interior surfaces where the enclosure panels can act as thermal energy emitters for climate control of the building's interior spaces.

Each proposed cladding panel includes at least a first panel (10), with a front side (11) and a back (12), made of laminated and calibrated ceramic with a uniform thickness between 3 mm and 6 mm, a second panel (20), with a front (21) and a back (22), made of insulating plastic material and with a thickness between 10 mm and 20 mm, the first panel (10) and the second panel (20) being bonded together.

The second panel (20) has, on its front side (21), a channel (40) engraved in low relief, which may be formed by moulding during the manufacture of the second panel (20), intended to channel a heat transfer fluid, typically water with antifreeze. This channel (40) shall be wider than the bottom and may have a semi-circular cross-section.

Figure 1:
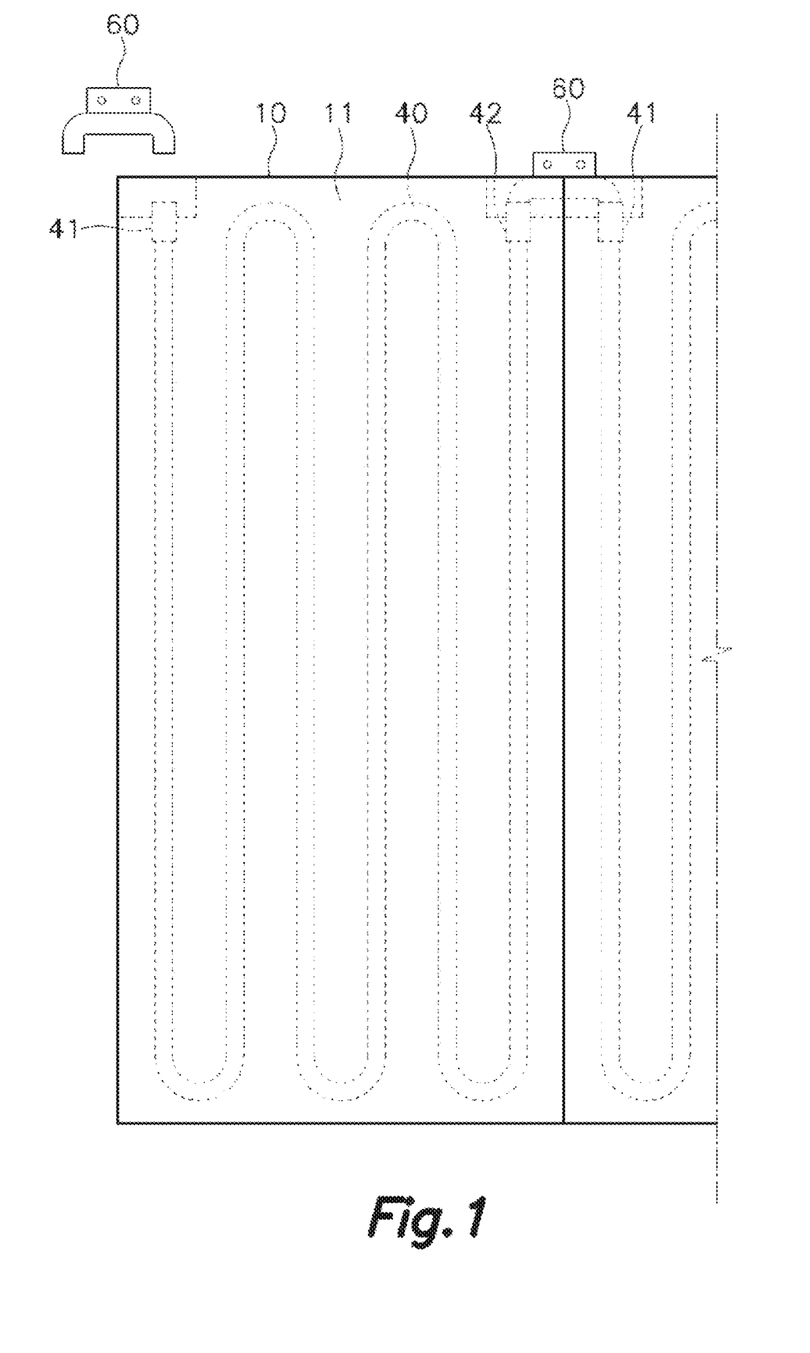
FIG. 1 shows a thermal energy collecting and/or emitter cladding panel according to a first embodiment, wherein the low relief channels of the second panel are serpentine channels shown in dashed line.
Figure 2:
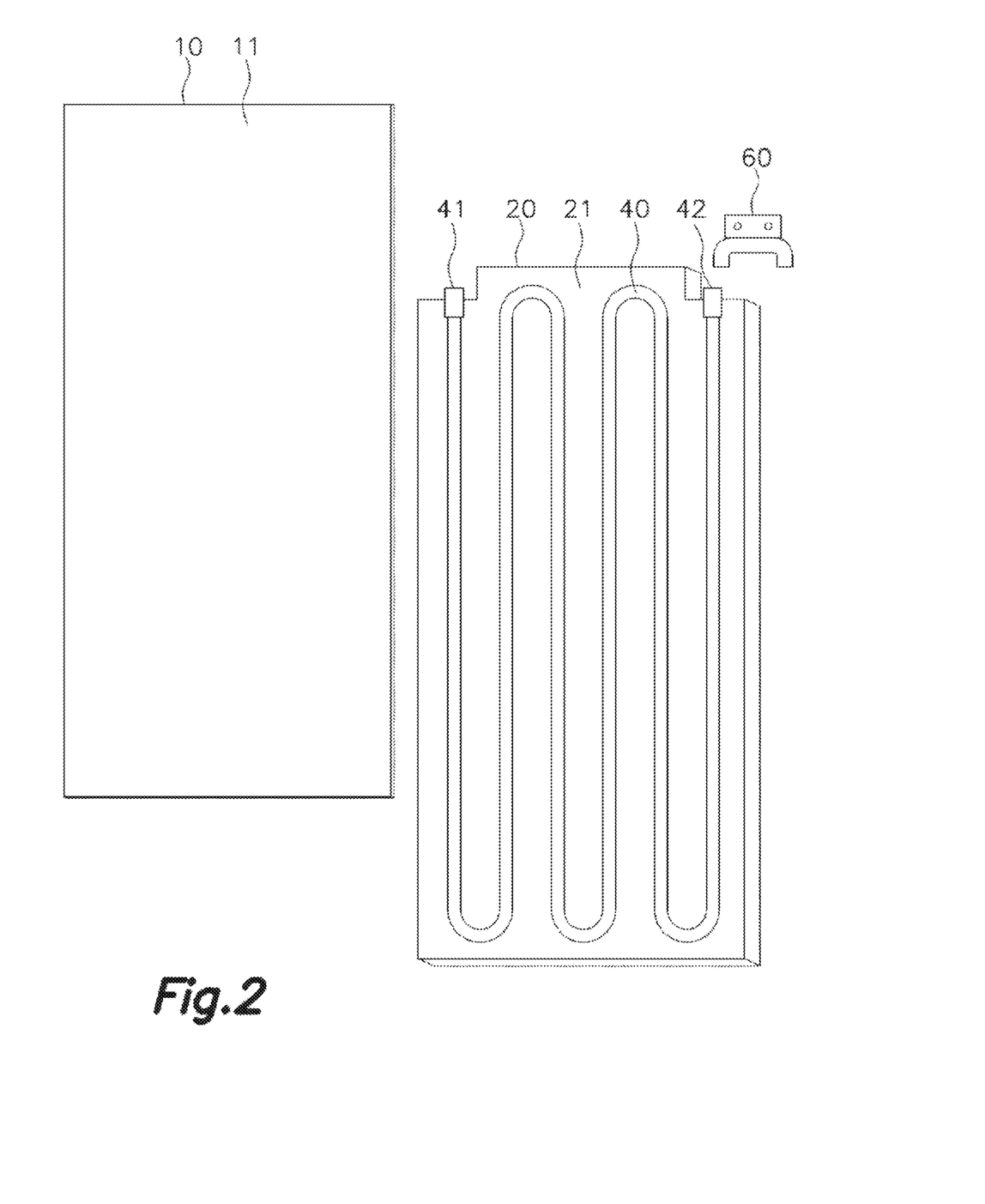
FIG. 2 shows an exploded perspective view of the cladding panel shown in FIG. 1 where the first panel is shown separately from the second panel.
Figure 5:
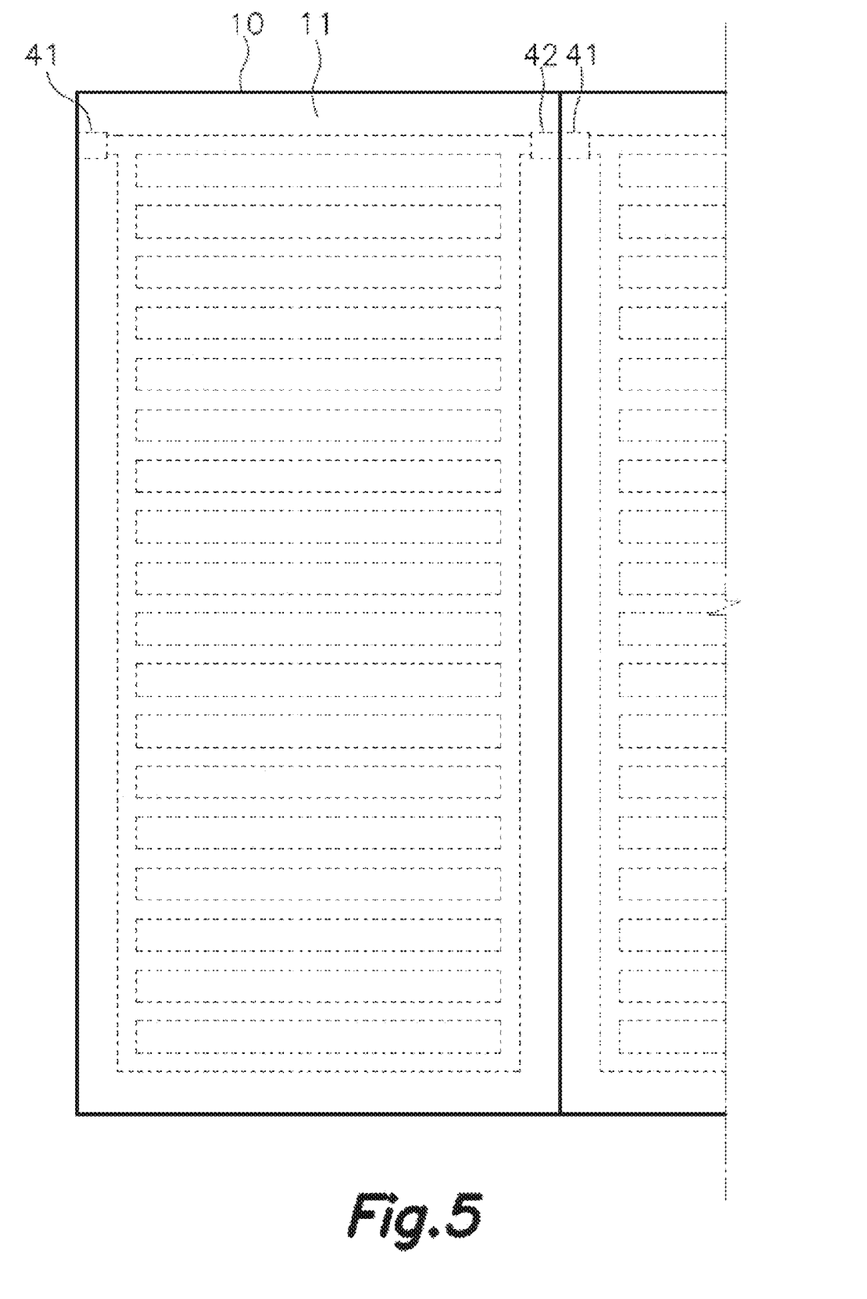
FIG. 5 shows an alternative embodiment of the cladding panel in which the low relief channels are branched channels, and in which the inlet and outlet connectors are coaxial and on opposite sides of the cladding panel.

In the embodiment shown in FIGS. 1 and 2, the channel (40) is a serpentine channel (40), whereas in the embodiment shown in FIG. 5 the channel (40) is a branched channel in an intermediate zone of the channel.

The front side (21) of the second panel (20) is bonded to a back side (12) of the first panel (10) at least on its perimeter or preferably on its entire surface, providing a watertight perimeter seal between the first panel (10) and the second panel (20), and closing off the channel (40) by bringing the heat transfer fluid channelled through the duct (40) into direct contact with the first panel (10) through a large contact surface, maximising heat transfer.

Two opposite ends of the channel (40) are connected one to an inlet connector (41) and the other to an outlet connector (42), provided to allow the watertight coupling of a conduit or to make a watertight connection of the outlet connector (42) of one panel to the inlet connector (41) of an adjacent panel.

For example, in FIGS. 1 and 2 show the inlet connectors (41) and outlet connectors (42) parallel to each other and parallel to the first panel (10), located at opposite ends of the same side of the cladding panel. These examples include a U-shaped connecting conduit for the interconnection of the outlet (42) and inlet connectors of adjacent panels.

This configuration allows the connecting conduit to be laid after the cladding panels have been placed in their final location, and also makes it possible to provide a mechanical anchorage between adjacent cladding panels.

In these embodiments shown, the connecting conduit also includes anchors (60), in the form of a plate with holes for fastening with screws to a support. This makes it possible to position the cladding panels, connect them to each other by means of a connecting conduit which can be inserted from the end of a row of cladding panels, and then fix each of these connecting conduits to a support by means of screws through the aforementioned anchor (60), the cladding panels being fixed to the support. The next row of cladding panels may include, at one end, complementary configurations with the anchorages (60) of the previous row, allowing them to be fixed.

Figure 3:
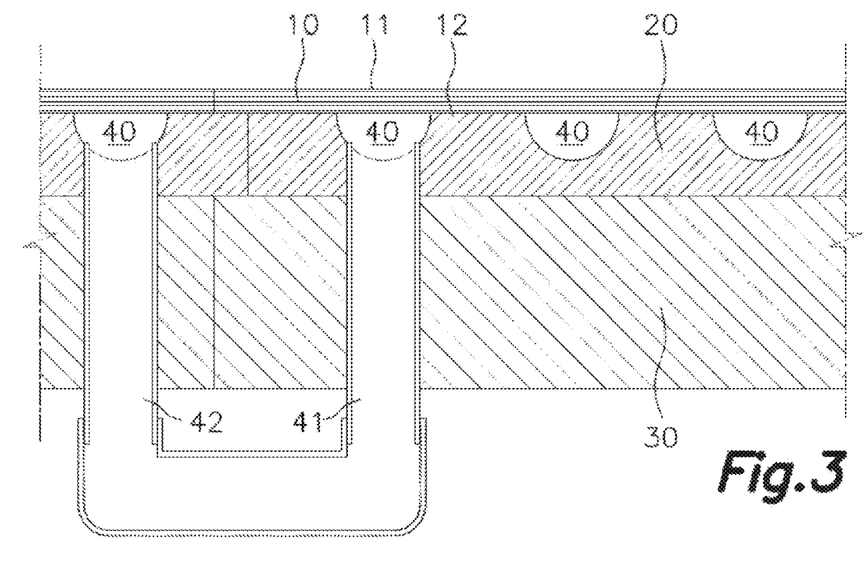
FIG. 3 shows an enlarged section view of a part of the proposed cladding panel, according to an embodiment in which the low relief channels are semi-circular and in which the cladding panel also includes a third insulating panel, the cladding panel being shown laterally connected to another identical cladding panel by means of a tongue and groove configuration, and in which the inlet and outlet connectors are perpendicular to the first panel and accessible from the reverse side of the cladding panel.
Figure 4:
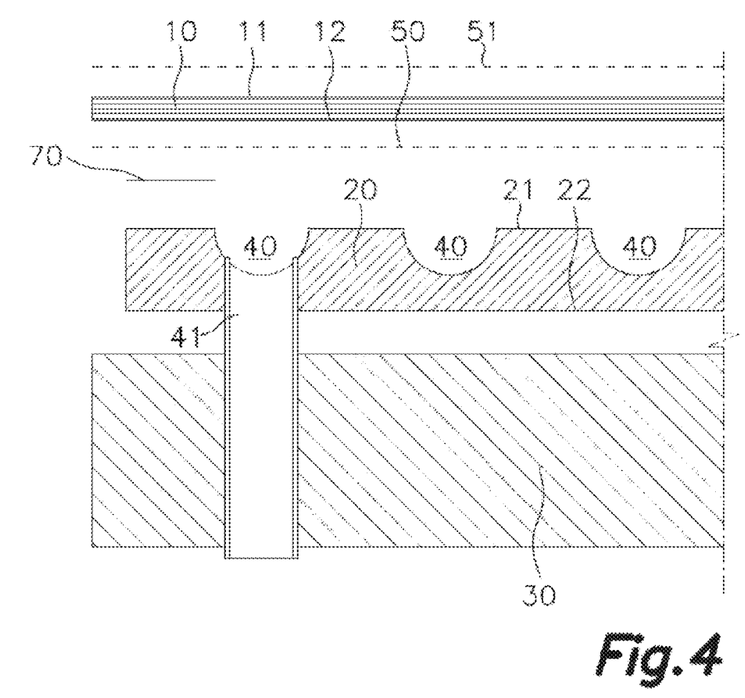
FIG. 4 shows an exploded view of the cladding panel shown in FIG. 3, where the first, second and third separate panels are shown, where the selective absorbent coating and the conductive coating on the front and back of the first panel are shown in a dashed line, and where the bonding sheet is shown.

In the embodiment shown in FIGS. 3 and 4, an inlet connector (41) is shown in the form of a conduit in communication with the end of the channel (40) and passing through the second panel (20) and also through the third panel (30), the conduit constituting the inlet connector (41) being completely surrounded by the constituent material of the second panel (20), to which it is attached forming a watertight seal.

According to the embodiment shown in FIG. 4, the first panel (10) includes a conductive coating (50) on its reverse side (12) with a thermal conductivity higher than that of the first panel (10) itself. The conductive coating (50) channels the heat from the entire surface of the back (12) of the first panel (10) to the heat transfer fluid contained in the channels (40) more efficiently, or distributes the heat from the heat transfer fluid contained in the channels (40) over the entire surface of the back (12) of the first panel (10).

When the coating panel is intended for thermal energy harvesting, the front side (11) of the first panel (10) may also include a selective absorbing coating (51) with high transparency to visible light and reduced transparency to infrared light, especially to infrared light in the far spectrum. This allows the incident solar energy, captured by the first panel, not to be lost as infrared light through the front side (11) of the first panel (10), without altering the appearance of the first panel or appreciably increasing its weight.

In FIG. 4 a bonding sheet (70) is also shown which is attached on one side to the reverse side (12) of the first panel (10) and on the other side to the front side (21) of the second panel (20).

This bonding sheet serves to improve the joint between the first panel (10) and the second panel (20), ensuring a watertight seal. In this example, the bonding sheet (70) may be made of a thermoplastic material and may be bonded to the first panel (10) by a hot-melt process, i.e. it is applied to the first panel (10) with heat causing at least partial melting and adhesion upon cooling, although the joining of the bonding sheet (70) to the first panel (10) by adhesives is not ruled out. This solution ensures good adhesion to the first panel (10) and provides a plastic material surface with good compatibility with the constituent material of the second panel (20) for proper adhesion, either by adhesives or by hot-melt.

The bonding sheet (70) is arranged at least on the perimeter of the second panel (20), surrounding the channel (40) in low relief, ensuring it is watertight.

In the embodiment shown in FIGS. 3 and 4, the cladding panel also includes a third panel (30) of insulating material, preferably thicker than the second panel (20) and made of a lighter and better insulating material than that constituting the second panel (20).

This allows the first and second panel assembly to be manufactured with the best possible thickness and with the best materials to ensure its watertightness, and to use the third panel (30) to achieve the desired insulation with the most suitable material to achieve this insulation without requirements related to the conduction of the heat transfer fluid. This also makes it possible to easily adapt the insulation of the panel without any additional difficulty or cost, simply by changing the thickness of the third panel.

The cladding panel described can be easily cut with tools commonly used for cutting ceramic materials, allowing its size to be adapted to the dimensions of the surface to be clad. Obviously, in the case of the cut cladding panels, the channel (40) is interrupted and therefore these cut panels cannot be connected to the heat transfer fluid circuit, but they can be combined with the other whole cladding panels and connected to the heat transfer fluid circuit. In this way, this system makes it possible to completely cover a surface, adapting to its size and shape.

In FIG. 6 shows a façade clad with cladding panels of this system in which, at its upper end, the cut cladding panels, marked with a pattern, have been included.

FIG. 6 also shows a covered roof with cladding panels of this type and where those cladding panels that are not exposed to direct sunlight, also marked with a raster, have simply not been connected to the heat transfer fluid circuit.

It shall be understood that the various parts constituting the invention described in one embodiment may be freely combined with the parts described in other embodiments, even if such combination is not explicitly described, provided that the result of such combination is within the scope of the claims and provided that there is no incompatibility in the combination.

The invention claimed is:

1. A thermal energy collecting and/or emitter cladding panel comprising:
   a first panel with an upper surface intended to be exposed, and with a lower surface;
   a second panel with an upper surface, adhered to the lower surface of the first panel, and with a channel in low relief defined in the upper surface of the second panel, the channel being attached to the lower surface of the first panel forming a conduit for channelling a heat transfer fluid, the adhesion between the first panel and the second panel forming a watertight seal for the heat transfer fluid at least in a perimeter area of the second panel;
   a heat transfer fluid inlet connector connected to a first end of the channel in low relief, and a heat transfer fluid outlet connector connected to a second end of the channel in low relief, the inlet connector and the outlet connector being connected to a heat transfer fluid circuit;
   characterised in that
   the first panel is made of laminated, calibrated ceramic material with a flat, smooth lower and upper surface and a uniform thickness of between 3 mm and 6 mm;
   the second panel is made of thermally insulating plastic, waterproof and temperature stable up to at least 120° C.

2. The cladding panel according to claim 1 wherein the second panel is composed of a non-foamed plastic, or a non-foamed plastic with a density between 600 kg/m$^3$ and 1200 kg/m$^3$, and/or with a thermal conductivity equal to or less than 0.25 W/m° K.

3. The cladding panel according to claim 1 wherein the second panel is composed of a foamed plastic, or a foamed plastic with a density between 10 kg/m$^3$ and 200 kg/m$^3$ and/or with a thermal conductivity equal to or less than 0.12 W/m° K.

4. The cladding panel according to claim 1, wherein
   the second panel has a thickness of 20 mm or less, and/or wherein the channel in low relief has a maximum depth of 15 mm or less, or
   the second panel has a thickness of 14 mm or less, and/or wherein the channel in low relief has a maximum depth of 10 mm or less.

5. The cladding panel according to claim 1 wherein the second panel is fused to the first panel.

6. The cladding panel according to claim 1 wherein the second panel is bonded to the first panel by means of an adhesive that is stable at temperatures up to at least 120° C.

7. The cladding panel according to claim 1 wherein the second panel is bonded to the first panel via a bonding sheet, or a bonding sheet made of a thermoplastic polymer bonded or hot-melted to the first panel and bonded or hot-melted to the second panel.

8. The cladding panel according to claim 1 wherein the channel in low relief is wider than the bottom and/or wherein the width of the channel in low relief is decreasing in depth and is maximal at its surface of contact with the lower surface with the first panel.

9. The cladding panel according to claim 1 wherein a third panel of thermal insulating material is also included, attached or adhered to the lower surface of the second panel.

10. The cladding panel according to claim 9 wherein the third panel has a higher thickness than the second panel and/or a lower density than the second panel and/or a lower thermal conductivity than the second panel.

11. The cladding panel according to claim 1 wherein the first panel has a density equal to or greater than 2200 kg/m$^3$ and/or a thermal conductivity equal to or greater than 0.8 W/m° K.

12. The cladding panel according to claim 1 wherein the cladding panel has a height of 2.2 m or more and/or a surface area of 1.5 m$^2$ or more and/or a weight of 25 kg/m$^2$ or less or 15 kg/m$^2$ or less.

13. The cladding panel according to claim 1 wherein the lower surface of the first panel has a conductive coating with a thermal conductivity higher than the thermal conductivity of the first panel.

14. A coating panel according to claim 13 wherein the conductive coating is a paint, a varnish, an enamel, or an enamel with metallic particles, or a metallic vapour deposition.

15. The cladding panel according to claim 1 wherein the first panel has, at least on its upper surface, a selective absorbing coating transparent to sunlight in the visible spectrum and with a low emissivity in the infrared and/or far-infrared light spectrum.

16. The cladding panel according to claim 15 wherein the selective absorbent coating is a varnish or an enamel.

17. The cladding panel according to claim 1 wherein the second panel is composed of one of the following materials: acrylic, polyamide, polycarbonate, polyester, expanded polystyrene, extruded polystyrene, polyisocyanurate, polyetheretherketone, polytetrafluoroethylene.

18. The cladding panel according to claim 1 wherein the perimeter of the cladding panel includes, on opposite sides, complementary tongue and groove configurations configured for the coupling of a succession of identical cladding panels through said tongue and groove configurations.

19. The cladding panel according to claim 1 wherein the inlet connector and the outlet connector are each a conduit through the second panel and are bonded to the second panel around its perimeter providing a heat transfer fluid-tight seal.

20. The cladding panel according to claim 1 wherein the inlet connector and the outlet connector are each a conduit in contact with both the first panel and the second panel, and bonded to both providing a heat transfer fluid tight seal.

21. The cladding panel according to claim 1 wherein the cladding panel is anchored to a support by means of anchors.

22. The cladding panel according to claim 21 wherein said anchors include the inlet connector and/or the outlet connector and/or a connecting conduit between the input and output conductors of adjacent cladding panels.

23. The cladding panel according to claim 1 wherein the cladding panel is adhered to a backing.

24. The cladding panel according to claim 1 wherein the first panel includes metallic additives or additives to increase its thermal conductivity.

25. The cladding panel according to claim 1 wherein the inlet connector and the outlet connector of the same panel are parallel to each other and are located opposite ends of the same side of the same side of the cladding panel.

* * * * *